US011126961B2

(12) United States Patent
Kulkarni Wadhonkar et al.

(10) Patent No.: US 11,126,961 B2
(45) Date of Patent: Sep. 21, 2021

(54) METHODS AND SYSTEMS FOR GENERATING A PLANOGRAM AT A RETAIL FACILITY

(71) Applicant: Walmart Apollo, LLC, Bentonville, AR (US)

(72) Inventors: Mangesh N. Kulkarni Wadhonkar, Hyderabad (IN); Akshay Jindal, Udaipur (IN); Natasha Agarwal, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/920,085

(22) Filed: Jul. 2, 2020

(65) Prior Publication Data
US 2021/0004756 A1    Jan. 7, 2021

Related U.S. Application Data

(60) Provisional application No. 62/892,363, filed on Aug. 27, 2019.

(30) Foreign Application Priority Data

Jul. 2, 2019  (IN) .............................. 201941026440

(51) Int. Cl.
*G06Q 10/08*    (2012.01)
*G06K 9/00*    (2006.01)
(Continued)

(52) U.S. Cl.
CPC ....... *G06Q 10/087* (2013.01); *G06K 9/00671* (2013.01); *G06T 7/11* (2017.01);
(Continued)

(58) Field of Classification Search
None
See application file for complete search history.

(56) References Cited

U.S. PATENT DOCUMENTS 8,189,855 B2    5/2012  Opalach
8,773,467 B2    7/2014  Chen-Quee
(Continued)

OTHER PUBLICATIONS

8ninths; "8ninths Retail Demo"; <https://8ninths.com/case-study/8ninths-retail-demo/>; Mar. 24, 2017; pp. 1-7; retrieved from Internet Archive Wayback Machine <https://web.archive.org/web/20170324133111/https://8ninths.com/case-study/8ninths-retail-demo/> on Sep. 23, 2020.
(Continued)

*Primary Examiner* — Jeffrey J Chow
(74) *Attorney, Agent, or Firm* — Fitch, Even, Tabin & Flannery, LLP

(57) ABSTRACT

Methods and systems for generating a planogram for a retail facility include an electronic device having a display screen and a camera. After a product physically stocked on a shelf on the sales floor of the retail store and contemplated to be replaced on the shelf by a better performing product is identified, a diminished reality virtual image of the location on the shelf where the product is physically positioned (but with the product to be replaced being omitted) is generated on the display screen. A virtual list including suggested replacement products selectable to virtually replace the product is then generated on the display screen, enabling selection of a replacement product. Then, based on the selected replacement product, a planogram is generated for the retail facility, with the selected replacement product being virtually displayed at the location from which the product physically positioned on the shelf was virtually removed.

14 Claims, 6 Drawing Sheets

(51) Int. Cl.
*G06T 11/00* (2006.01)
*G06T 7/11* (2017.01)
*G06F 3/0482* (2013.01)

(52) U.S. Cl.
CPC ............ *G06T 11/00* (2013.01); *G06F 3/0482* (2013.01); *G06T 2200/24* (2013.01)

(56) References Cited

U.S. PATENT DOCUMENTS

| | | | |
|---|---|---|---|
| 9,886,678 B2 | 2/2018 | Yan | |
| 9,953,350 B2 | 4/2018 | Pugazhendhi | |
| 2003/0171979 A1* | 9/2003 | Jenkins | G06Q 10/087 705/7.37 |
| 2013/0006790 A1 | 1/2013 | Raskin | |
| 2013/0030915 A1 | 1/2013 | Statler | |
| 2013/0173435 A1* | 7/2013 | Cozad, Jr. | G06Q 10/087 705/28 |
| 2014/0258050 A1* | 9/2014 | Abboud | G06Q 10/087 705/28 |
| 2015/0088703 A1* | 3/2015 | Yan | G06F 3/147 705/28 |
| 2017/0140314 A1 | 5/2017 | Cundiff | |
| 2017/0185951 A1 | 6/2017 | Kawashima | |
| 2017/0364994 A1 | 12/2017 | Parker | |
| 2018/0150791 A1* | 5/2018 | Stansell | G06T 7/50 |
| 2018/0181913 A1* | 6/2018 | Higa | G06Q 10/0875 |
| 2018/0204174 A1 | 7/2018 | Soon-Shiong | |
| 2018/0300043 A1* | 10/2018 | Graham | G06F 3/04842 |
| 2018/0300681 A1* | 10/2018 | Gaur | G06Q 30/0643 |
| 2020/0339354 A1* | 10/2020 | Soto Arriaza | B65G 1/1375 |
| 2021/0042724 A1* | 2/2021 | Rathod | G06Q 30/06 |

OTHER PUBLICATIONS

Groovejones; "AR Based Planograms for Sales and Merchandising"; <https://www.groovejones.com/ar_based_planograms/>; Sep. 16, 2017; pp. 1-5.

* cited by examiner

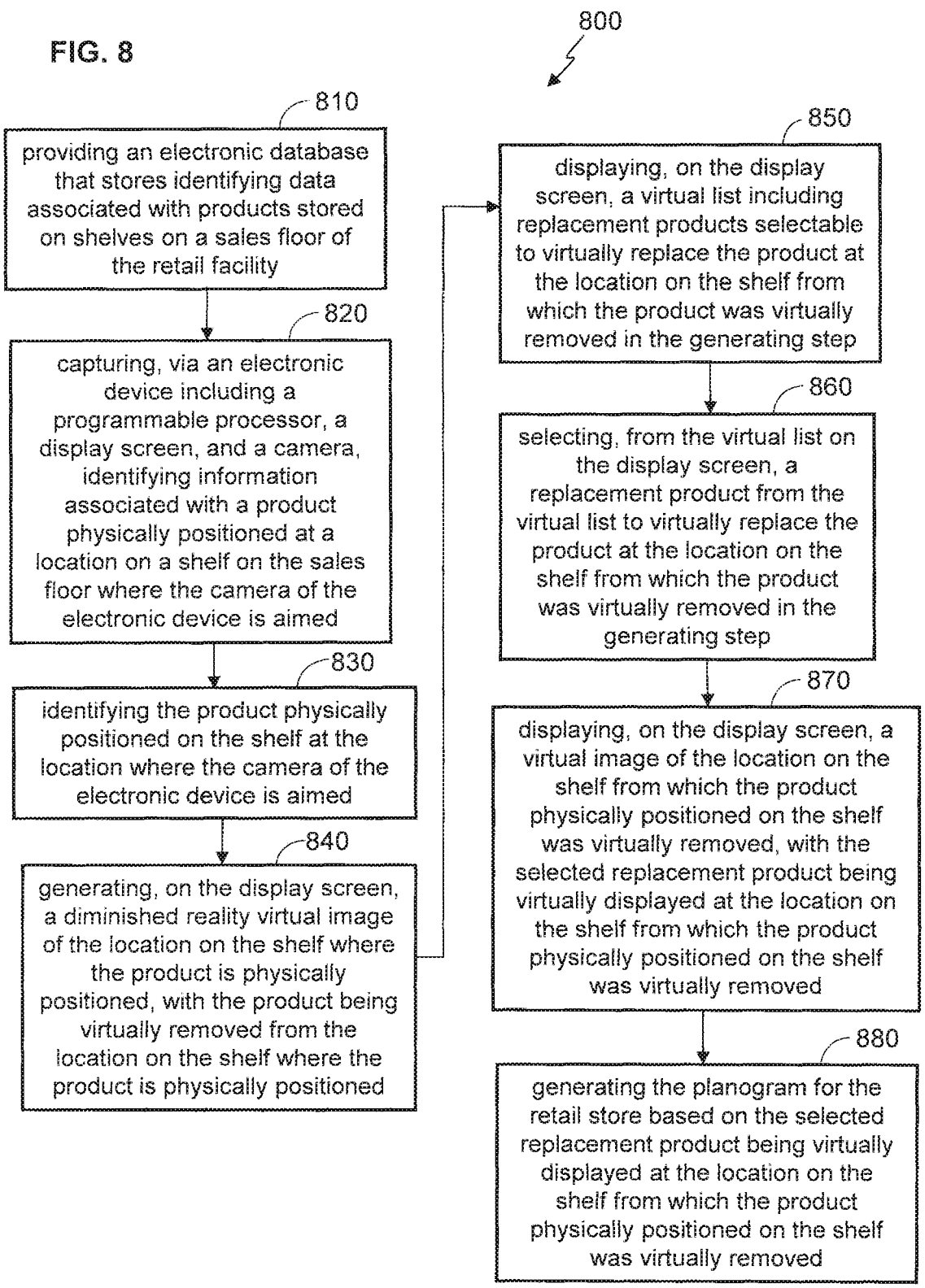

METHODS AND SYSTEMS FOR GENERATING A PLANOGRAM AT A RETAIL FACILITY

CROSS-REFERENCE TO RELATED APPLICATIONS

This application claims the benefit of U.S. provisional application No. 62/892,363, filed Aug. 27, 2019, and claims the benefit of Indian provisional patent application no. 201941026440, filed Jul. 2, 2019, both of which are incorporated by reference herein in their entirety.

TECHNICAL FIELD

This invention relates generally to generating planograms for retail stores, and, in particular, to planogram generation using diminished and/or augmented reality.

BACKGROUND

Retailer often utilize planograms to design a physical layout of their retail facilities. Generally, a planogram is a diagram or model that indicates the placement of retail products on shelves on the sales floor of a retail store in order to maximize product sales at the retail store. While developing planograms, it is often difficult for retail store workers to visualize the existing modular setup within that facility, and to determine which products can be replaced on the shelves with other products in order to increase the product sales at the retail store.

BRIEF DESCRIPTION OF THE DRAWINGS

Disclosed herein are embodiments of systems, apparatuses and methods pertaining to methods and systems for generating planograms for a retail facility. This description includes drawings, wherein:

FIG. 8 is a flow diagram of an exemplary process of for generating planograms for a retail facility in accordance with some embodiments.

Figure 1:
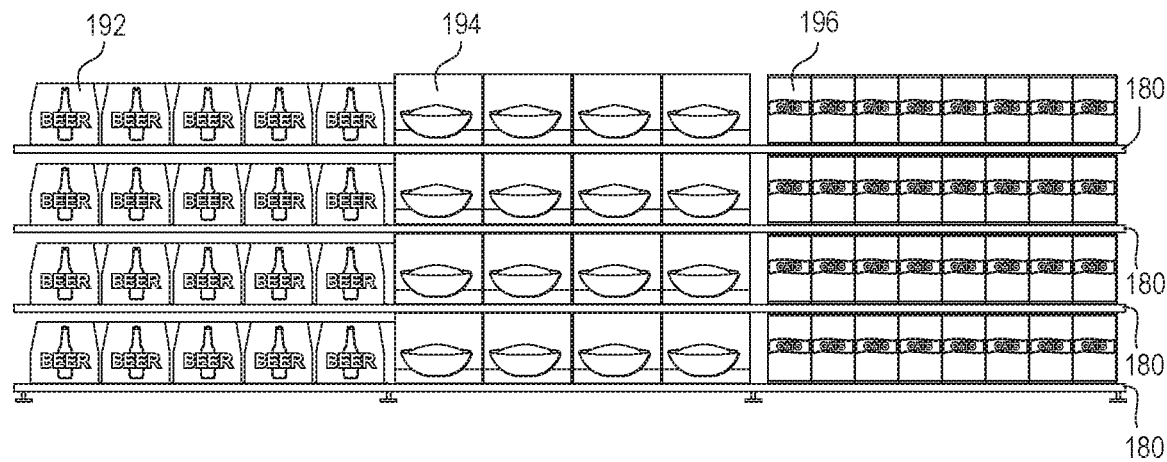
FIG. 1 is a diagram of a system for generating planograms for a retail facility, shown with an electronic device pointed at shelves on a sales floor that stock multiple units of three different retail products in accordance with some embodiments.
Figure 1:
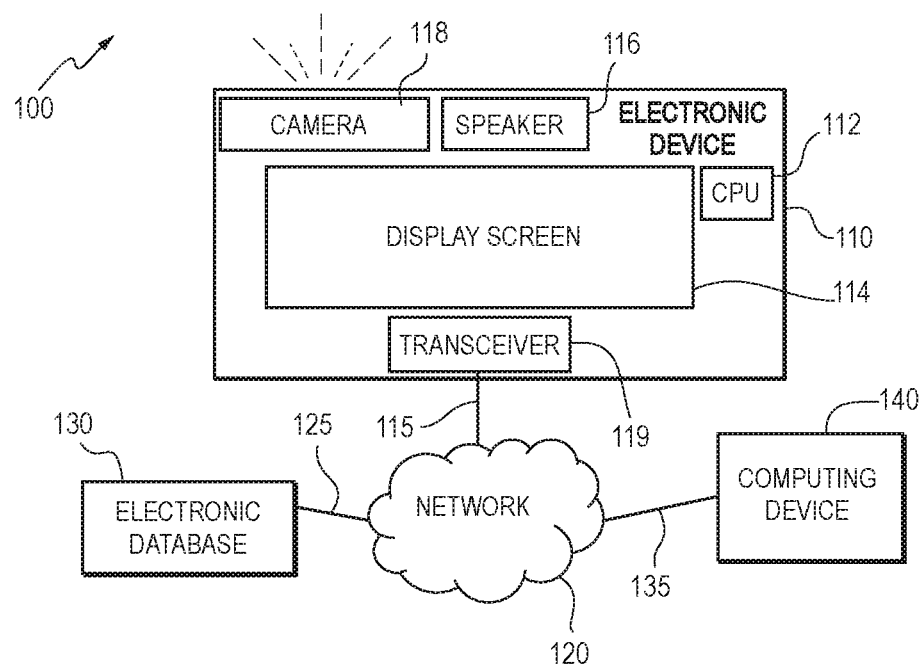

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, this application describes systems and methods for generating planograms for a retail facility while adding, deleting, and/or replacing products on store shelves in real time using augmented virtual reality and diminished virtual reality.

In one embodiment, a system of generating a planogram for a retail facility, the method includes an electronic database that stores identifying data associated with products stored on shelves on a sales floor of the retail facility and an electronic device including a programmable processor, a display screen, and a camera configured to capture identifying information associated with at least one product physically positioned at a location on a shelf on the sales floor where the camera of the electronic device is aimed. The processor of the electronic device is programmed to: identify the at least one product physically positioned on the shelf at the location where the camera of the electronic device is aimed; generate, on the display screen, a diminished reality virtual image of the location on the shelf where the product is physically positioned, with the at least one product being virtually removed from the location on the shelf where the at least one product is physically positioned; display, on the display screen, a virtual list including replacement products selectable to virtually replace the at least one product at the location on the shelf from which the at least one product was virtually removed; select, from the virtual list on the display screen, a replacement product from the virtual list to virtually replace the at least one product at the location on the shelf from which the at least one product was virtually removed; display, on the display screen, a virtual image of the location on the shelf from which the at least one product physically positioned on the shelf was virtually removed, with the selected replacement product being virtually displayed at the location on the shelf from which the at least one product physically positioned on the shelf was virtually removed; and generate the planogram for the retail store based on the selected replacement product being virtually displayed at the location on the shelf from which the at least one product physically positioned on the shelf was virtually removed.

In another embodiment, a method of generating a planogram for a retail facility includes: providing an electronic database that stores identifying data associated with products stored on shelves on a sales floor of the retail facility; capturing, via an electronic device including a programmable processor, a display screen, and a camera, identifying information associated with at least one product physically positioned at a location on a shelf on the sales floor where the camera of the electronic device is aimed; identifying the at least one product physically positioned on the shelf at the location where the camera of the electronic device is aimed; generating, on the display screen, a diminished reality virtual image of the location on the shelf where the product is physically positioned, with the at least one product being virtually removed from the location on the shelf where the at least one product is physically positioned; displaying, on the display screen, a virtual list including replacement products selectable to virtually replace the at least one product at the location on the shelf from which the at least one product was virtually removed in the generating step; selecting, from the virtual list on the display screen, a replacement product from the virtual list to virtually replace the at least one product at the location on the shelf from which the at least one product was virtually removed in the generating step; displaying, on the display screen, a virtual image of the location on the shelf from which the at least one product physically positioned on the shelf was virtually removed, with the selected replacement product being virtually displayed at the location on the shelf from which the at least one product physically positioned on the shelf was virtually removed; and generating, by the processor of the electronic device, the planogram for the retail store based on the selected replacement product being virtually displayed at the location on the shelf from which the at least one product physically positioned on the shelf was virtually removed.

FIG. 1 shows one exemplary embodiment of a system 100 for generating a planogram for a retail facility. While FIG. 1 shows only four shelves 180 including only 68 products displayed thereon, namely, 20 units of a first exemplary product 192 (beer), 16 units of a second exemplary product 194 (pudding), and 32 units of a third exemplary product 196 (e.g., oats) stored thereon for simplicity, it will be appreciated that the system 100 may be used to generate a planogram for a retail facility of any size, with the retail facility including thousands of shelves 180 and hundreds of thousands of products stocked thereon.

A retail facility or retail store will be understood to mean any entity operating as a brick-and-mortar physical store and/or product storage/distribution facility and/or a website accessible, for example, via the internet or another network, by way of which products may be ordered by customers. A customer will be understood as an individual or a business entity. Exemplary products that may be stocked at and sold by a retail store may include, but are not limited to, general-purpose consumer goods, as well as consumable products, such as medications, food items, and dietary supplements.

The exemplary system 100 depicted in FIG. 1 includes an electronic device 110 that facilitates the generation of the planogram for the retail facility. The electronic device 110 may be a stationary, portable, and/or hand-held electronic device, for example, a desktop computer, a laptop computer, a tablet, a mobile phone, or any other electronic, processor-based device that may be configured for data entry and communication with the other components of the system 100, which will be described in more detail below. It will be appreciated that the electronic device 110 may be physically separate from the computing device 140 as illustrated in FIG. 1 or may be implemented as a single device that incorporates both the electronic device 110 and the computing device 140.

The electronic device 110 illustrated in FIG. 1 may be a head-mountable device (e.g., Oculus Rift virtual reality system or other headsets, Google Glass or the like optical head-mounted displays, etc.), or a portable hand-held device (e.g., a laptop computer, a tablet, a mobile phone, or any other electronic device configured for data entry and one-way and/or two-way communication with one or more other electronic devices via a wired or wireless network 120). In the embodiment of FIG. 1, the electronic device 110 is configured to communicate via a transceiver 119 with an electronic database 130 (which can store identifying data associated with products 192, 194, 196 stored on shelves 180 on a sales floor of the retail facility) and a computing device 140 (which will be described in more detail below) over the network 120 via two-way communication channels 115, 125, 135, which may be wired or wireless.

The network 120 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 (e.g., electronic database 130) may include cloud-based features, such as cloud-based memory storage.

In some embodiments, the exemplary electronic database 130 of the system 100 of FIG. 1, which may be implemented as one database or a collection of a plurality of databases), is configured to receive and store electronic information associated with the products 192, 194, 196 stocked on shelves 180 on the sales floor of the retail facility, and electronic information (e.g., one or more planograms) associated with the storage space on the shelves 180 at the retail facility. For example, in some aspects, the electronic database 130 stores electronic data configured to facilitate generation of a virtual recommended replacement product list (described in more detail below). Such electronic data can include, but not limited to: information associated with upcoming product promotions at the retail facility, locations of the products 192, 194, 196 on the shelves 180 on a sales floor of the retail facility, space available on the shelves 180 on the sales floor of the retail facility, demand score for each of the products 192, 194, 196 stored on shelves 180 on the sales floor of the retail facility, and associated products 192, 194, 196 that are often bought with the products 192, 194, 196 stored on shelves 180 on the sales floor of the retail facility. In some embodiments, the electronic database 130 is configured to store electronic data representing the planogram generated by the processor of the electronic device 110, or the planogram generated by the processor of the computing device 140 based on such electronic information.

The electronic database 130 may be stored, for example, on non-volatile storage media (e.g., a hard drive, flash drive, or removable optical disk) internal or external relative to the computing device 140. It will be appreciated that the electronic database 130 may be physically separate from the computing device 140 as illustrated in FIG. 1, may be stored on one or more servers remote to the retail facility and in communication with the computing device 140, or may be incorporated into the physical structure of the computing device 140. In some embodiments, the electronic data stored in the electronic database 130 may be data transmitted to the electronic database 130 from the electronic device 110. Alternatively, the electronic data stored in the electronic database 130 may be transmitted to the electronic database 130 from the computing device 140 and/or any other computing device local to or remote to the retail facility.

In some embodiments, the system 100 includes one or more localized Internet-of-Things (IoT) devices and controllers in communication with the computing device 140. As a result, in some embodiments, the localized IoT devices and controllers can perform most, if not all, of the computational load and associated monitoring that would otherwise be performed by the computing device 140, and then later asynchronous uploading of summary data can be performed by a designated one of the IoT devices to the computing device 140, or a server remote to the computing device 140. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 140 or a server remote to the computing device 140.

In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KM includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

In the embodiment shown illustrated in FIG. 1, the exemplary electronic device 110 includes a central processing unit (CPU) 112 including a programmable processor, a display screen 114 configured to display digital images, a speaker 116 configured to emit audible sounds to a user (e.g., retail store worker), and a camera 118 configured to capture identifying information associated with one or more products 194, 194, 196 physically positioned in different locations on the shelves 180 (e.g., on the sales floor of a retail store) at which the camera 118 of the electronic device 110 is aimed. In some aspects, as will be described in more detail below, the electronic device 110 is configured to transmit a query including the camera-captured identifying information associated with one or more products 192, 194, 196 to the electronic database 130.

In some embodiments, the products 192, 194, 196 may be identified in the electronic database 130 by way of unique product identifiers (e.g., barcode, serial number, RFID (radio frequency identification), SKU (stock keeping unit number), images of the actual product, or the like). After the camera 118 of the electronic device 110 (e.g., a hand-held smartphone, tablet, etc., a head-mounted eyewear, or the like) is aimed towards the product-containing shelves 180 and captures identifying information associated with one or more products 192, 194, 196 physically positioned on the shelves 180 on the sales floor, the CPU 112 of the electronic device 110 is programmed to identify the product(s) physically positioned on the shelves 180 at the location(s) where the camera 118 of the electronic device 110 is aimed.

In certain aspects, in order to identify the product(s) acquired by the camera 118 of the electronic device 110, the CPU 112 of the electronic device 110 is programmed to cause the electronic device 110 to transmit a query including the camera-acquired image of the product(s), or the camera-acquired image of an identifier (e.g., a label or the like) associated with the at least one product to the electronic database 130. As a result of this query, the camera-acquired image of the product(s), or the camera-acquired image of a product identifier is referenced against the product identifiers stored in the electronic database 130, and the product(s) acquired by the camera 118 of the electronic device 110 can be identified.

In some aspects, in addition to identifying the product(s) captured by the camera 118 of the electronic device 110, the CPU 112 is programmed to determine the precise location of the electronic device 110 on the sales floor of the retail facility at the time when the camera 118 is used to capture the location on the shelves 180 where the product(s) 192, 194, 196 are stocked. In one aspect, the electronic device 110 includes a location finder feature, for example a sensor (e.g., global positioning system (GPS), beacon, or the like) that enables the CPU 112 (or the control circuit 610 of the computing device 140) to determine the location of the electronic device 110 at the retail facility, and thereby extrapolate the location of the shelf/shelves 180 being aimed at by the camera 118 of the electronic device 110. In some embodiments, the location of a shelf at the retail facility may be identified by including a label on the shelf, storing the locations associated with all of the labels in the electronic database 130, and capturing the shelf label information via the camera 118 of the electronic device 110 when the camera 118 is aimed at the shelf 180.

In certain embodiments, when the camera 118 of the electronic device 110 is used to capture the location on the shelves 180 where the products 192, 194, and 196 are displayed to the customers at the retail facility, the CPU 112 of the electronic device 110 is programmed to indicate to the user a specific one of the products (e.g., 194, see FIG. 2) to select for virtual deletion and replacement by a potential replacement product. To that end, in some aspects, the CPU 112 of electronic device 110 is programmed to generate, on the display screen 114, a graphical object (e.g., highlighting, border line, etc.) visibly indicating that the product 194 is selectable for virtual removal from the locations on the shelves 180 where the product 194 is physically positioned.

In some embodiment, the CPU 112 is programmed to analyze the historical/forecasted revenue factors associated with the products 192, 194, 196 in order to determine which of the products (e.g., 194) is to be suggested for replacement in the to-be-generated planogram. Such revenue factors, which indicate the estimated impact of the products 192, 194, 196 on the gross sales of the retail facility, may include, but are not limited to: revenue generated by the products 192, 194, 196 at the retail facility within a predetermined interval of time, number of units of the products 192, 194, 196 sold at the retail facility within the predetermined interval of time, revenue forecast to be generated by the products 192, 194, 196 at the retail facility within a predetermined upcoming interval of time; and historical data indicating customer foot traffic in an isle at the retail facility containing the shelves 180 where the at products 192, 194, 196 are physically positioned.

In some aspects, a foot print indicating customer foot traffic in an isle of the retail facility may be generated by analysis (e.g., via the CPU 112, via the control circuit 610 of the computing device 140, or via a specially-programmed processor of another computing device), of video feeds from different CCTV cameras installed at each isle of the retail facility. In one aspect, feature extraction from such video fees enables the CPU 112 to determine the locations and positions/orientations of the customer in the isles, and to generate a customer footprint map in response to analyzing the movement of the customers in the isles of the retail facility over a preselected period of time.

Figure 2:
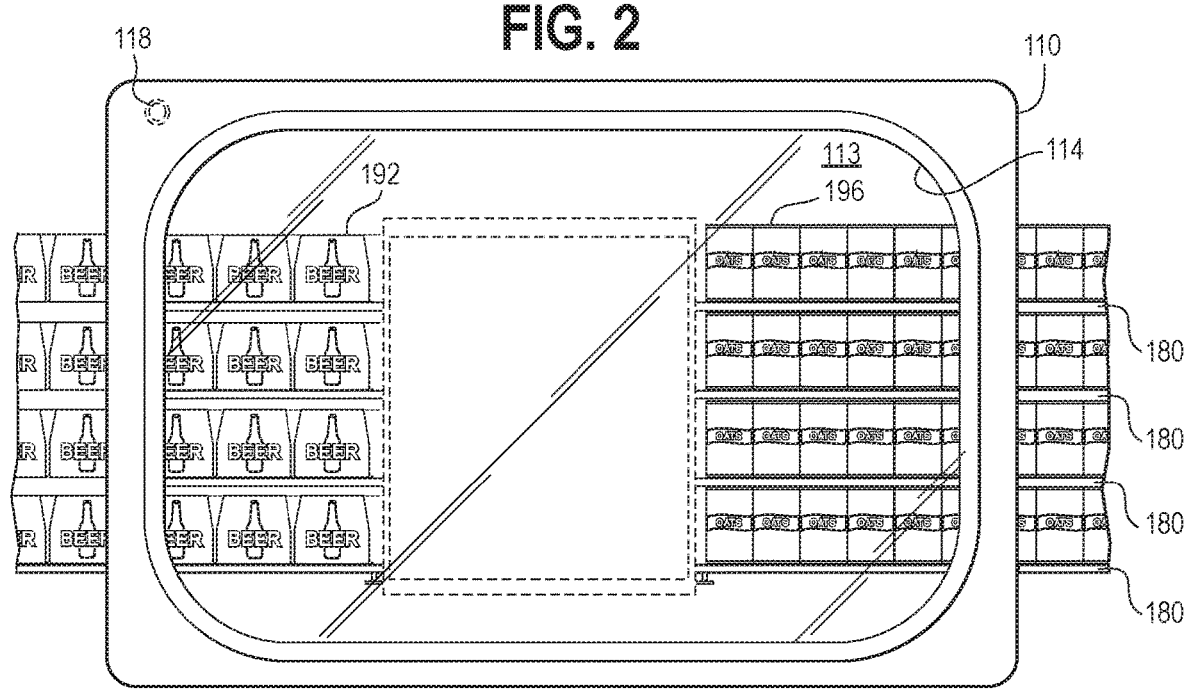
FIG. 2 is a diagram of the system of FIG. 1, shown with the electronic device displaying a diminished reality virtual image of the location on the shelves where the units of product 2 are physically positioned, with all units of product 2 being virtually removed from their physical location on the shelves.

With reference to FIG. 2, in some embodiments, after the product 194 and the location of the shelves 180 on which the product 194 is displayed at the retail facility are identified by the CPU 112, the CPU 112 is programmed to generate, on the display screen 114 of the electronic device 110, a diminished reality virtual image 113 of the location on the shelves 180 where the product 194 is physically positioned. The diminished reality virtual image 113 may be a 2D image or a 3D image. In some embodiments, the diminished reality image 113 may be generated by the control circuit 610 of the computing device 140 and transmitted to the electronic device 110 for display on the display screen 114 of the electronic device 110.

As can be seen in FIG. 2, in the exemplary diminished reality virtual image 113 displayed on the screen 114, all units of the product 194 are virtually removed from their actual locations on the shelves 180 where they are physically positioned, leaving an empty space created by the virtual removal of each of the units (all 16 of them) of the product 194 from the shelves 180. In some embodiments, the diminished reality image 113 is generated by the CPU 112 of the electronic device 110 (or the control circuit 610 of the computing device 140) as follows: each frame of the feed of the camera 118 of the augmented reality-enabled electronic device 110 is continuously processed and a selected object (e.g., product 194) that needs to be removed to create the diminished reality virtual image 113 gets segmented from a given frame and can be deleted to virtually remove the product 194 from the locations on the shelves 180 where the product 194 is physically positioned.

In some embodiments, after the diminished reality virtual image 113 shown in FIG. 2 is generated by the CPU 112 of the electronic device, the CPU 112 is programmed to generate, on the display screen 114, a virtual list 117 (see FIG. 3) including suggested replacement products 191, 193, 195 selectable to virtually replace the virtually removed product 194 at the virtually empty locations on the shelves 180 (from which the units of the product 194 were virtually removed in the diminished reality virtual image 113 of FIG. 2). In certain aspects, the CPU 112 is programmed to generate an intelligent list of replacement products 191, 193, 195 based on an analysis of various factors that affect the decision, by the CPU 112 of the electronic device 110 or the control circuit 610 of the computing device 140, of which replacement products will be more profitable replacements for the virtually removed product 194. Such factors include, but are not limited to, analysis of electronic data relating to upcoming product promotions, types/identities of nearby products on the sales floor, space available on the shelves 180, demand scores of the products, and related products (i.e., products that are frequently bought together).

Figure 3:
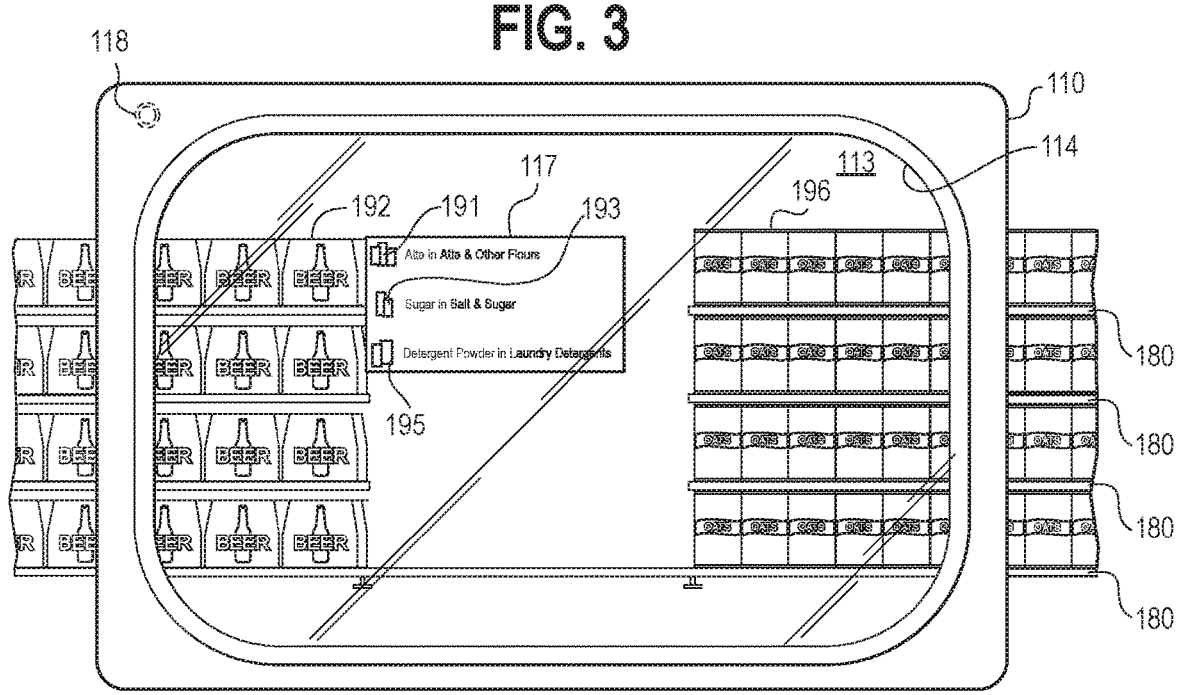
FIG. 3 is a diagram of the system of FIG. 1, shown with the electronic device displaying a virtual list including suggested replacement products selectable by a worker to virtually replace product 2 at the location on the shelf from which product 2 was virtually removed in the diminished reality image.
Figure 4:
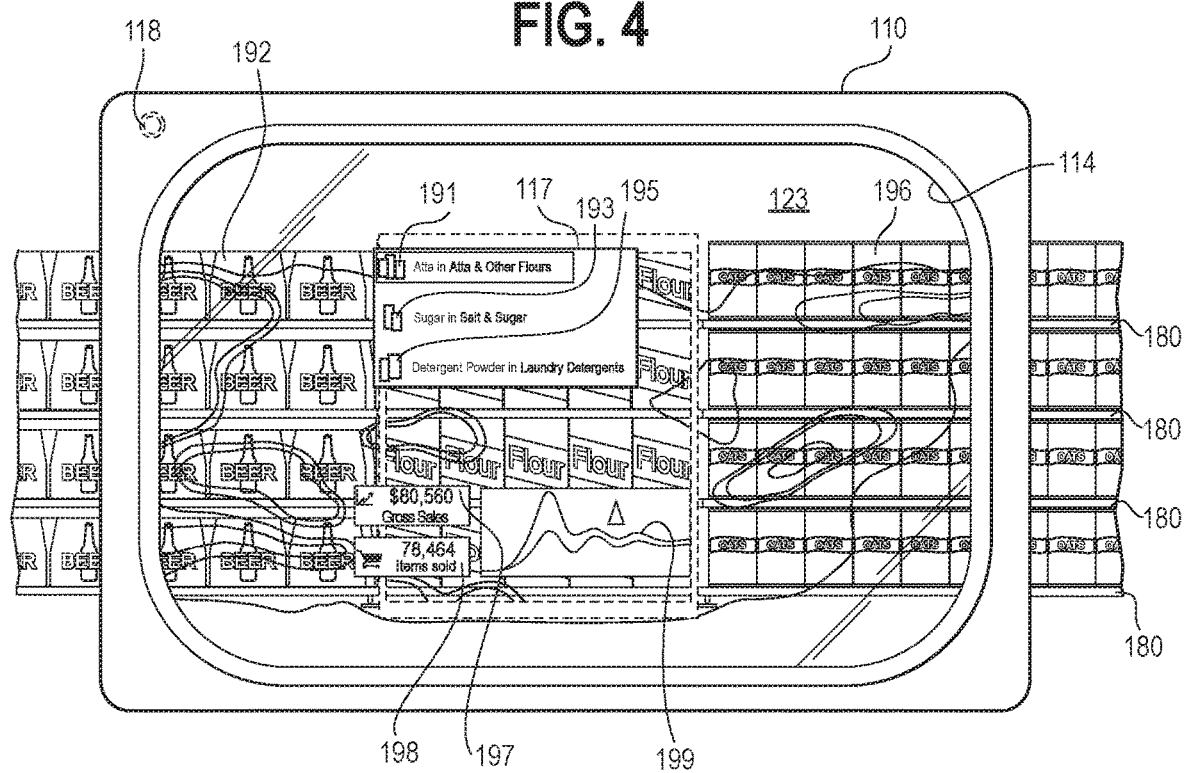
FIG. 4 is a diagram of the system of FIG. 1 shown with the electronic device displaying a virtual image of the location on the shelves from which the units of the on-shelf product 2 were virtually removed n the diminished reality image, with units of a first selected suggested replacement product being virtually displayed at the location on the shelves from which the units of the on-shelf product 2 were virtually removed in the diminished reality image.

In the embodiments illustrated in FIGS. 3 and 4, the virtual list 117 of suggested replacement products 191, 193, 195 is configured such that each of the suggested replacement products 191, 193, and 195 is a selectable graphical element that is linked to additional information about the replacement product 191, 193, 195. In other words, as shown in FIGS. 4, and 5, respectively, if the replacement product 191 or 193 is selected by a user by interacting with (e.g., clicking, pressing, touching, etc.) a respective link underlying each of the suggested replacement products 191, 193, 195, then the CPU 112 of the electronic device 110 or the control circuit 610 of the computing device 140 causes the electronic device 110 to transmit a query to the electronic database 130 in order to obtain additional information relating to the selected suggested replacement product 191 or 193.

In some aspects, the additional information that may be obtained from the electronic database 130 relates to the estimated financial impact of the suggested replacement products 191, 193, and 195 for the retail store if one of the suggested replacement products 191, 193, and 195 were to be selected for physically replacing the product 194 on the shelves 180 from which the product 194 was virtually removed. With reference to FIGS. 4 and 5, such additional information, when obtained by the electronic device 110 or computing device 140 from the electronic database 130, can be shown on the display screen 114 of the electronic device 110 in several ways.

Figure 5:
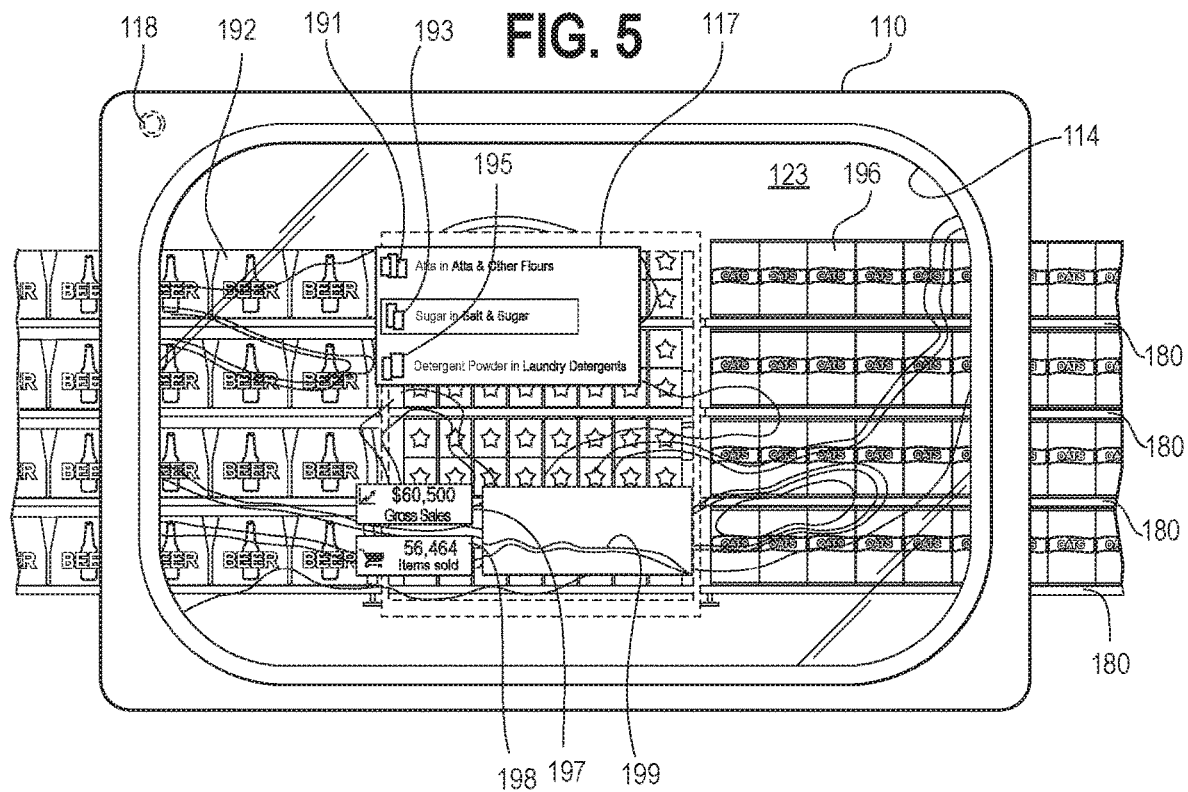
FIG. 5 is a diagram of the system of FIG. 1 shown with the electronic device displaying a virtual image of the location on the shelves from which the units of the on-shelf product 2 were virtually removed in the diminished reality image, with units of a second suggested replacement product being virtually displayed at the location on the shelves from which the units of the on-shelf product 2 were virtually removed in the diminished reality image.

In some aspects, the additional information regarding the suggested replacement product 191 (FIG. 4) or suggested replacement product 193 (FIG. 5) can include a graphical element 197 (e.g., an icon, window, etc.) indicating the number of units of the replacement products 191 and 193 estimated to be sold at the retail facility within a given window of time (e.g., one month (as shown in FIGS. 4 and 5), 1 week, 3 months, 6 months, 1 year, etc.). In some aspects, in addition to, or instead of the graphical element 197, the additional information regarding the suggested replacement products 191 (FIG. 4) and 193 (FIG. 5) can include a graphical element 198 (e.g., an icon, window, etc.) indicating the estimated gross sales of the replacement products 191 (FIG. 4) and 193 (FIG. 5) within a given window of time (e.g., one month (as shown in FIGS. 4 and 5), one week, 1 month, 3 months, 6 months, 1 year, etc.).

In some aspects, in addition to or instead of the graphical elements 197 and 198, the additional information regarding the suggested replacement products 191 (FIG. 4) and 193 (FIG. 5) can include a graphical element 199 in the form of a heat map, indicating the customer foot print (predicted customer foot traffic in an isle at the retail facility containing the shelf where the selected replacement product will be physically positioned) estimated to result within a given window of time (e.g., a month (as shown in FIGS. 4 and 5), 1 week, 1 month, 3 months, 6 months, 1 year, etc.) from the placement of the suggested replacement products 191 or 193 on the shelves 180. In certain aspects, the CPU 112 of the computing device 140 is programmed to estimate the gross sales of the suggested replacement products 191 and 193 based on an analysis of factors including, but not limited to: demographics of customers that have historically purchased products at the retail store, sales data from nearby retail stores, sales of related (affine) products, and sales of products frequently bought together with certain products.

In some embodiments, after the user of the electronic device 110 scrolls through the suggested replacement products 191, 193, 195 and understands the estimated financial impact for the retail store if any one (or more) of these suggested replacement product 191, 193, 195 were to be selected for replacing the on-shelf product 194 in the to-be-generated planogram for the retail store, and after the user of the electronic device 110 decides which of the suggested replacement products 191, 193, and 195 will actually replace the on-shelf product 194 in the to-be-generated planogram, the user of the electronic device 110 is permitted to save the selected replacement product (e.g., 191 or 193). In response, as shown in the exemplary embodiments shown in FIGS. 4 and 5, an augmented reality image 123 is generated on the display screen 114, where the on-shelf product 194 is virtually replaced with the selected replacement product 191 (FIG. 4) or the selected replacement product 193 (FIG. 5). The diminished reality virtual image 113 may be a 2D image or a 3D image.

In certain aspects, as will be described in more detail below, in response to the user selecting/saving a replacement product 191 for virtually replacing the product 194, the CPU 112 of the electronic device 110 or the control circuit 610 of the computing device 140 is programmed to select, from the virtual list 117 on the display screen 114, the replacement product 191 to virtually replace the product 194 at the location on the shelf 180 from which the product 194 was virtually removed when the diminished reality image 113. In one aspect, the CPU 112 of the electronic device 110 or the control circuit 610 of the computing device 140 is programmed to cause the electronic device 110 to display, on the display screen 114, an augmented reality image 123 of the location on the shelves 180 from which the product 194 physically positioned on the shelf was virtually removed, with the selected replacement product (191 in FIGS. 4 and 193 in FIG. 5) being virtually displayed on the display screen 114 at the location on the shelves 180 from which the on-shelf product 194 was virtually removed.

In some embodiments, after the user saves his/her selection for virtually replacing the product 194 in the to-be-generated planogram, the CPU 112 of the electronic device 110 or the control circuit 610 of the computing device 140 is programmed to generate the planogram for the retail store by incorporating into the planogram the replacement product 191 or 193 that was selected and saved as a virtual replacement of the product 194 by the user. In an exemplary planogram, the selected and saved replacement product is virtually displayed at the location on the shelves 180 from which the product 194 physically positioned on the shelves 180 was virtually removed. In some aspects, the generated planogram is transmitted by the electronic device 110 or the computing device 140 to the electronic database 130 for storage and/or future retrieval.

Figure 6:
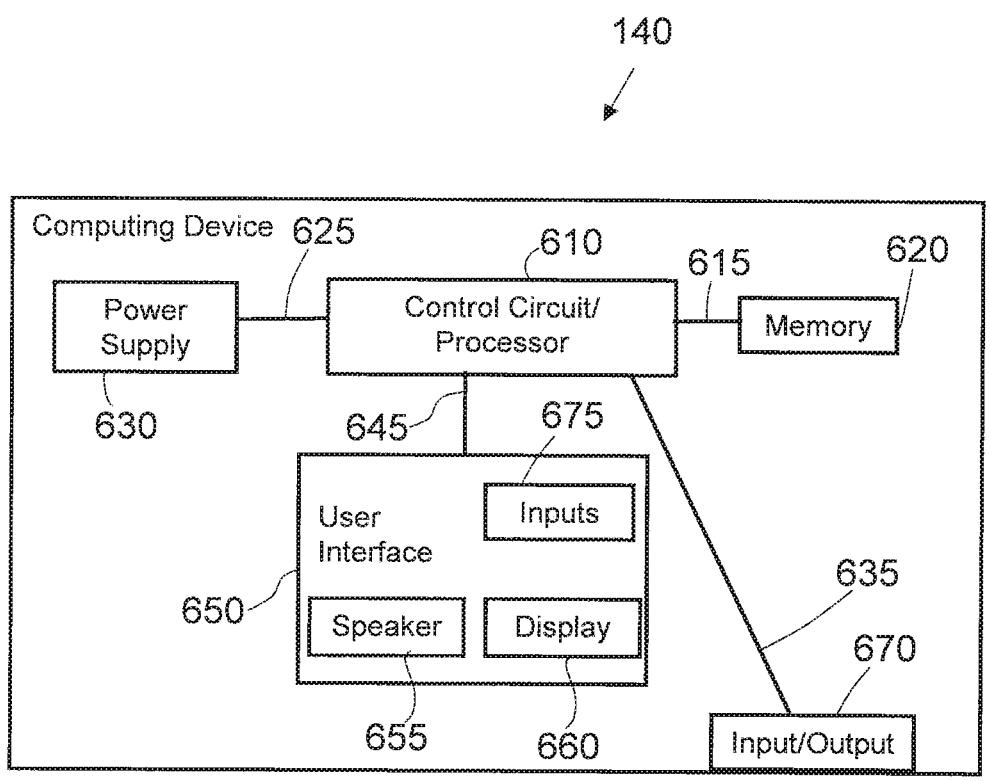
FIG. 6 is a functional diagram of an exemplary computing device in accordance with some embodiments.

With reference to FIG. 6, the exemplary computing device 140 shown in FIG. 1 and configured for use with the systems and methods described herein. The computing device 140 may be a stationary, portable, and/or hand-held electronic device, for example, a desktop computer, a laptop computer, a tablet, a mobile phone, or any other electronic, processor-based device that may be configured for data entry and communication with the other components of the system 100. It will be appreciated that the computing device 140 may be physically separate from the electronic device 110 as illustrated in FIG. 1 or may be implemented as a single device that incorporates both the computing device 140 and the electronic device 110.

The computing device 140 may include a programmable control circuit 610 including a processor (for example, a microprocessor or a microcontroller) electrically coupled via a connection 615 to a memory 620 and via a connection 625 to a power supply 630. The control circuit 610 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 610 of the computing device 140 can be configured (e.g., by using corresponding programming stored in the memory 620 as will be well understood by those skilled in the art) to carry out one or more of the steps, actions, and/or functions described herein. In some embodiments, the memory 620 may be integral to the processor-based control circuit 610 or can be physically discrete (in whole or in part) from the control circuit 610 and is configured non-transitorily store the computer instructions that, when executed by the control circuit 610, cause the control circuit 610 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit may be referred to as a non-transitory medium or non-transitory computer readable medium.

The control circuit 610 of the computing device 140 is also electrically coupled via a connection 635 to an input/output 670 that can receive signals from electronic devices in communication over the network 120 with the computing device 140 (e.g., signals from the electronic device 610 including identifying data associated with the products 192, 194, 196 stocked on the shelves 180, signals from the electronic database 130 including electronic data obtained by the computing device 140 from the electronic database 130, etc.), or from any other source that can communicate with the computing device 140 via a wired or wireless connection (e.g., channels 115, 125, 135, etc.) over the network 120. The input/output 670 of the computing device 140 can also send signals to electronic devices in communication over the network 120 with the computing device 132 (e.g., to send a query for data to the electronic database 150, and/or to send the data retrieved from the electronic database 150 to the electronic device 110), or to any other source that can communicate with the computing device 140 via a wired or wireless connection).

In the embodiment shown in FIG. 6, the processor-based control circuit 610 of the computing device 140 is electrically coupled via a connection 645 to a user interface 650, which may include a visual display or display screen 660 (e.g., LED screen) and/or button input 675 that provide the user interface 650 with the ability to permit an operator of the computing device 140 to manually control the computing device 140 by inputting commands via touch-screen and/or button operation and/or voice commands. It will be appreciated that the performance of such functions by the computing device 140 is not dependent on a human operator, and that the control circuit 610 may be programmed to perform such functions without a human operator.

In some embodiments, the display screen 660 of the computing device 140 is configured to display various graphical interface-based menus, options, and/or alerts that may be transmitted to the computing device 140 and displayed on the display screen 660 in connection with various aspects of planogram generation at the retail facility. It will be appreciated that the display screen 660 of the computing device 140 may be configured as both a display screen and an input 675 (e.g., a touch-screen that permits an operator to press on the display screen 660 to enter text and/or execute commands.)

Figure 7:
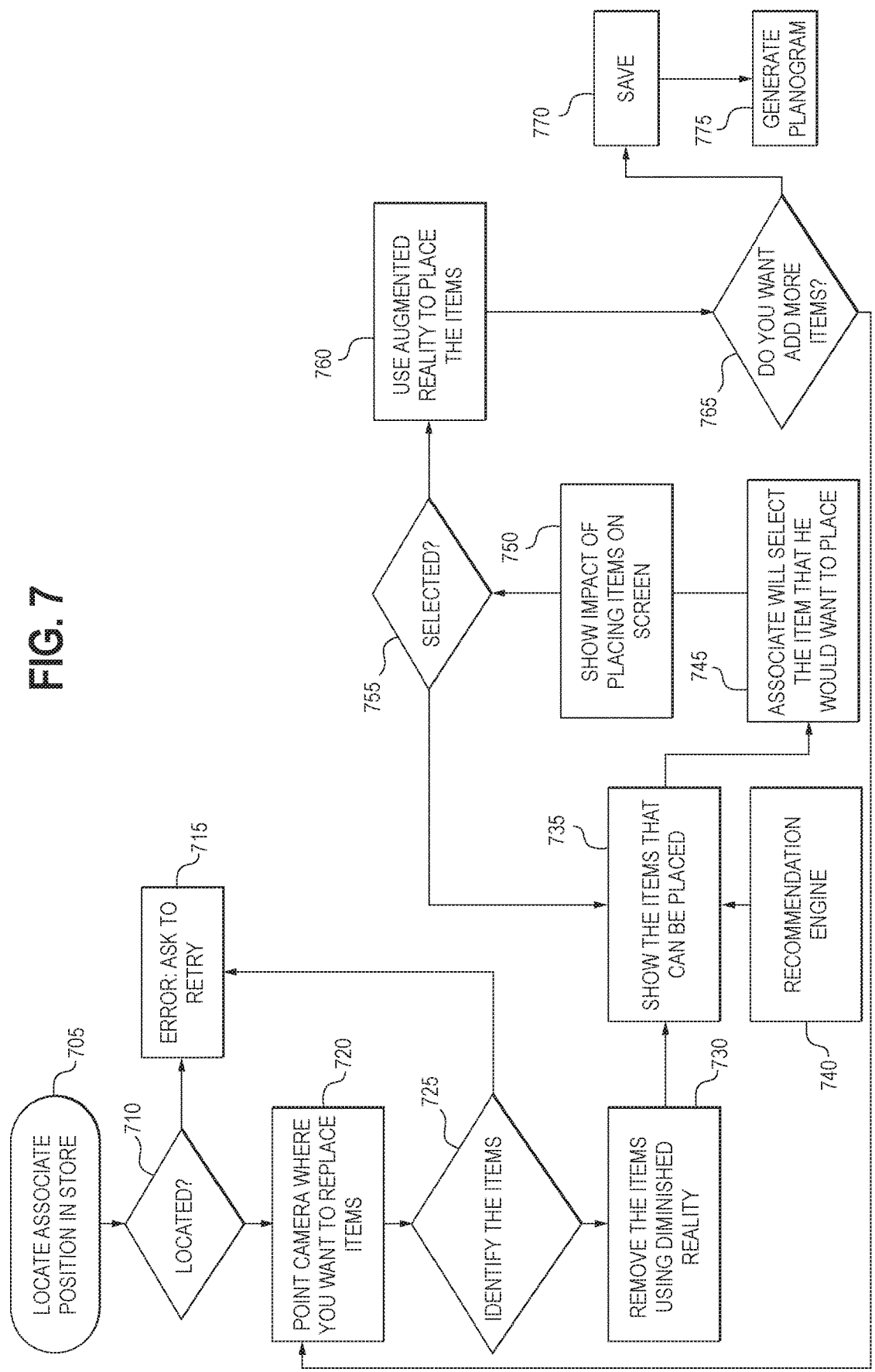
FIG. 7 is an exemplary process flow of a process of for generating planograms for a retail facility in accordance with some embodiments.

FIG. 7 depicts an exemplary process flow 700 of generating a planogram for a retail store using augmented reality and diminished reality according to some possible embodiments. As an initial step, the CPU 112 of the electronic device 110 (or the control circuit 610 o the computing device 140) is programmed to analyze a locating (e.g., GPS) signal of the electronic device 110 in order to identify the location of the electronic device 110 at the retail store (step 705). In some embodiments, when a user attempts to use the electronic device 110 to generate a planogram, if the location of the electronic device 110 is successfully identified (step 710), the process proceeds forward and the associate is permitted to use the electronic device 110 to point the camera 118 of the electronic device 110 at a given location on the shelves 180 on the sales floor of the retail store where the product(s) are stocked (step 720). If not, an error message is generated (internally by the electronic device 110 or via the computing device 140 transmitting an electronic alert to the electronic device 110), instructing the user to retry aiming the camera 118 at the shelves 180 (step 715).

In some embodiments, when the user points the camera 118 of the electronic device 110 at the shelves 180 on the sales floor of the retail store where the products 192, 194, and 196 are physically located, the products 192, 194, and 196 are displayed to the user via the display screen 114 of the electronic device 110 in such a way as to identify the products 192, 194, and 196 to the user (step 725). In addition, the products 192, 194, and 196 that are physically located on the shelves 180 are displayed within a graphical interface on the display screen 114 such that the user is permitted to select one or more of the products 192, 194, 196 for virtual deletion and replacement by one or more replacement products.

In some aspects, when a user selects a given product (e.g., product 194) for replacement by a replacement product, the electronic device 110 is configured to generate, on the display screen 114, a diminished reality virtual image 113 of the location on the shelves 180 where the product 194 is physically positioned (step 730). As mentioned above, the diminished reality virtual image 113 may be generated internally to the electronic device 110 via the CPU 112, or may be generated via the control circuit 610 of the computing device 140 and in response to a signal transmitted from the computing device 140 to the electronic device 110. In some embodiments, when the diminished reality virtual image 113 is displayed on the display screen 114 of the electronic device 110, all units of the product 194 are virtually removed from their actual locations on the shelves 180 where they are physically positioned, leaving an empty space created by their virtual removal, and a virtual list 117 of suggested replacement products 191, 193, and 195 is displayed on the display screen 114 of the electronic device 110 (step 735).

As mentioned above, the virtual list 117 can include suggested replacement products 191, 193, 195 generated by the CPU 112 of the electronic device 110 or the control circuit 610 of the computing device 140 based on an analysis of various financial impact factors. The virtual list 117 is selectable by the user to virtually replace the virtually removed product 194 at the locations on the shelves 180 from which the units of the product 194 were virtually removed in the diminished reality virtual image 113. In one aspect, the virtual list 117 of the suggested replacement products 191, 193, 195 is generated via a recommendation engine (step 740), which, as described above, can be configured to generate the virtual list 117 of suggested replacement products 191, 193, 195 based on an analysis of various factors including, but not limited to, upcoming product promotions, nearby products on the sales floor, shelf space available on the sales floor, product demand scores, and products that are frequently bought together by consumers.

In some implementations (see FIGS. 4 and 5), when the user of the electronic device 110 selects a given replacement product 191 or 193 from the virtual list 117 for possibly replacing the product 194 (step 745) in the to-be-generated planogram, the CPU 112 of the electronic device 110 or the control circuit 610 of the computing device 140 transmits a query to the electronic database 130 to obtain additional information relating to the selected suggested replacement product 191 or 193. When the information requested by this query is obtained from the electronic database 130, the display screen 114 of the electronic device 110 displays additional information relating to the estimated financial impact of the suggested replacement products 191 and 193 (step 750) for the retail store if the suggested replacement product 191 or 193 were to be selected for replacing the product 194 on the shelves 180 in the to-be-generated planogram.

In some embodiments, after the user of the electronic device 110 decides which of the suggested replacement products 191, 193, and 195 of the virtual list 117 will actually replace the on-shelf product 194 in the to-be-generated planogram, the user is permitted to save the selected replacement product (step 755). In one aspect, in response to the user selecting/saving a replacement product from the virtual list 117 (e.g., by selecting the chosen replacement product on the display screen 114) for virtually replacing the product 194, an augmented reality image 123 (see FIGS. 4 and 5) is generated on the display screen 114 of the electronic device 110 (step 760). This augmented reality image depicts on the display screen 114 the location on the shelves 180 from which the on-shelf product 194 was virtually removed, with the selected replacement product 191 being virtually displayed on the display screen 114 at the location on the shelves 180 from which the on-shelf product 194 was virtually removed.

In the embodiment depicted in FIG. 7, the user is presented with the option to select additional products (e.g., 192 and/or 196) physically stocked on the shelves 180, but not chosen for replacement in the to-be-generated planogram by a suggested replacement product 191, 193, of 195 (step 765). If the user elects (e.g., by clicking an appropriate graphical element in the interface) to add more products (e.g., 194 and/or 196) for possible virtual replacement in the to-be-generated planogram, then the process flow returns back to step 720. If the user does not elect to add more products for possible virtual replacement by a suggested replacement product in the to-be-generated planogram, the user is permitted to save the final selections (step 770), and a planogram is generated based on the user's final selections (step 775).

With reference to FIG. 8, an exemplary method 800 of generating a planogram at a retail facility includes providing an electronic database 130 that stores identifying data associated with products 192, 194, 196 stored on shelves 180 on a sales floor of the retail facility (step 810). The method 800 further includes capturing, via an electronic device 110 including a programmable CPU 112, a display screen 114, and a camera 118, identifying information associated with a product (e.g., 194) physically positioned at a location on a shelf 180 on the sales floor where the camera 118 of the electronic device 110 is aimed (step 820). As mentioned above, in some embodiments, this step may be permitted only if the physical location of the electronic device 110 at the retail store is ascertained (e.g., by the CPU 112 of the electronic device 110 or the control circuit 610 of the computing device 140). Otherwise, in some aspects, an error message pops up on the display screen 114 of the electronic device 110 and requests that the physical location of the electronic device 110 be verified.

In FIG. 8, the exemplary method 800 further includes identifying the product (e.g., 194) physically positioned on the shelf 180 at the location where the camera 118 of the electronic device 110 is aimed (step 830). As mentioned above, the products 192, 194, 196 may be identified by way of the camera 118 (or another sensor of the electronic device 110) scanning unique product identifiers (e.g., barcode, serial number, RFID, SKU, images of the actual product, or the like).

In some aspects, after when the user of the electronic device 110 selects a given product (e.g., product 194) for possible replacement by a suggested replacement product, the method 800 of FIG. 8 further includes generating, on the display screen 114 of the electronic device 110, a diminished reality virtual image 113 of the location on the shelves 180 where the product (e.g., 194) is physically positioned, with the product physically located on the shelves 180 being virtually removed from its location on the shelf 180 (step 840). As explained above, when the diminished reality virtual image 113 is displayed on the display screen 114 of the electronic device 110, all units of the product 194 are virtually removed from their actual locations on the shelves 180 where they are physically positioned, leaving an empty space on the shelves 180 created by their virtual removal.

With reference back to FIG. 8, the exemplary method 800 further includes displaying, on the display screen 114, a virtual list 117 including suggested replacement products (e.g., 191, 193, 195) selectable to virtually replace the product 194 at the location on the shelves 180 from which the product 194 was virtually removed in the preceding step (step 850). As mentioned above, the virtual list 117 can be generated by a product recommendation engine and can include suggested replacement products 191, 193, 195 selectable by the user to virtually replace the virtually removed on-shelf product 194 at the locations on the shelves 180 from which the units of the on-shelf product 194 were removed in the diminished reality virtual image 113.

As mentioned above, in some aspects, the user of the electronic device 110 is permitted to select a replacement product 191 or 193 from the virtual list 117 for possibly replacing the product 194 in the to-be-generated planogram. To that end, the exemplary method 800 includes selecting, from the virtual list 117 on the display screen 114, a replacement product from the virtual list 117 to virtually replace the product 194 at the location on the shelves 180 from which the product 194 was virtually removed in step 840 (step 860). The method 800 of FIG. 8 further includes selecting, from the virtual list 117 on the display screen, a replacement product (e.g., 191 or 193) from the virtual list 117 to virtually replace the product (e.g., 194) at the location on the shelves 180 from which the product 194 was virtually removed during step 840 (step 860). In particular, in some embodiments, after the user of the electronic device 110 makes a decision as to which of the suggested replacement products 191, 193, and 195 of the virtual list 117 will virtually replace the on-shelf product 194 in the to-be-generated planogram, the user of the electronic device 110 is permitted to save the selected replacement product.

In some aspects, after the user makes his/her replacement product selection, an augmented reality image 123 is generated on the display screen 114, depicting the location on the shelves 180 from which the on-shelf product 194 was virtually removed, with the selected replacement product (191 in FIGS. 4 and 193 in FIG. 5) being virtually displayed instead of the on-shelf product 194 at the location on the shelves 180 from which the on-shelf product 194 was virtually removed. To that end, the method 800 includes displaying, on the display screen 114, a virtual image of the location on the shelves 180 from which the on-shelf product 194 was virtually removed, with the selected replacement product (e.g., 191 or 193) being virtually displayed at the location on the shelves 180 from which the on-shelf product 194 was virtually removed (step 870).

Finally, after the user finalizes both the product to be virtually replaced and the replacement product for the to-be-generated planogram, the exemplary method 800 of FIG. 8 includes generating the planogram for the retail store, with the selected replacement product being virtually displayed in the generated planogram at the location on the shelves 180 from which the on-shelf product 194 was virtually removed (step 880). As mentioned above, the planogram may be generated by the CPU 112 of the electronic device 110 and transmitted to the computing device 140 and/or electronic database 130, or may be generated by the control circuit 610 of the computing device 140 and transmitted to the electronic database 130.

The systems and methods described herein provide for efficient generation of planograms for retail stores. More specifically, the systems and methods described herein advantageously identify products that may be replaced at a retail store in order to improve gross sales at the store and identify potential replacement products that may facilitate this gross sales improvement. In addition, the systems and methods described herein advantageously enable the worker to toggle in real-time between potential replacement products and understand the financial impact of each potential replacement product for the retail store.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of generating a planogram for a retail facility, the method comprising:
   an electronic database that stores identifying data associated with products stored on shelves on a sales floor of the retail facility;
   an electronic device including a programmable processor, a display screen, and a camera configured to capture identifying information associated with at least one product physically positioned at a location on a shelf on the sales floor where the camera of the electronic device is aimed, wherein the processor of the electronic device is programmed to:
   analyze revenue generated by the at least one product physically positioned at the location on the shelf on the sales floor where the camera of the electronic device is aimed and generate a graphical object on the display screen to visibly identify the at least one product that is physically positioned on the shelf at the location where the camera of the electronic device is aimed and that is recommended by the processor of the electronic device to be replaced by a replacement product based on a forecast by the processor of the electronic device that the replacement product will generate more revenue for the retail facility if placed on the shelf instead of the at least one product that is physically positioned on the shelf;
   generate, on the display screen, a diminished reality virtual image of the location on the shelf where the product is physically positioned, with the at least one product being virtually removed from the location on the shelf where the at least one product is physically positioned;
   generate a virtual list of recommended replacement products based on a forecast by the processor of the electronic device that each of the recommended replacement products will generate more revenue for the retail facility if placed on the shelf instead of the at least one product that is physically positioned on the shelf, and display, on the display screen, the virtual list including the recommended replacement products that are selectable to virtually replace the at least one product at the location on the shelf from which the at least one product was virtually removed;
   select, from the virtual list on the display screen, one of the recommended replacement products from the virtual list to virtually replace the at least one product at the location on the shelf from which the at least one product was virtually removed;
   display, on the display screen, a virtual image of the location on the shelf from which the at least one product physically positioned on the shelf was virtually removed, with the selected one of the recommended replacement products from the virtual list being virtually displayed at the location on the shelf from which the at least one product physically positioned on the shelf was virtually removed; and
   generate the planogram for the retail store based on the selected one of the recommended replacement products being virtually displayed at the location on the shelf from which the at least one product physically positioned on the shelf was virtually removed.

2. The system of claim 1, wherein the electronic device is one of: a head-mountable virtual reality device, a smart tablet, and a smart phone.

3. The system of claim 1, wherein the electronic device is configured to transmit a query including the identifying information associated with the at least one product captured by the camera from the electronic device to the electronic database.

4. The system of claim 1, wherein the processor is further programmed to generate the diminished reality virtual image including an empty space instead of the at least one product in the location on the shelf where the at least one product is physically positioned.

5. The system of claim 4, wherein the processor is further programmed to:
   obtain a camera feed including a plurality of frames generated by the camera of the electronic device during the capturing step;
   segment a frame containing the at least one product being virtually removed from the location on the shelf where the at least one product is physically positioned; and
   delete the at least one product from the segmented frame to virtually remove the at least one product from the location on the shelf where the at least one product is physically positioned.

6. The system of claim 1, wherein:
   the electronic database is configured to store electronic data configured to facilitate generation of the virtual list by the processor of the electronic device, the electronic data including at least one of: information associated with upcoming product promotions at the retail facility, locations of the products on the shelves on the sales floor of the retail facility, space available on the shelves on the sales floor of the retail facility, demand score for each of the products stored on shelves on the sales floor of the retail facility, and associated products that are often bought with the products stored on shelves on the sales floor of the retail facility; and
   the processor is further programmed to generate the virtual list including the recommended replacement products based on analysis, by the processor of the electronic device, the electronic data stored on the electronic database.

7. The system of claim 1, wherein the processor is further programmed to cause the electronic device to transmit the planogram to the electronic database for storage and subsequent retrieval by another electronic device.

8. A method of generating a planogram for a retail facility, the method comprising:
   providing an electronic database that stores identifying data associated with products stored on shelves on a sales floor of the retail facility;
   capturing, via an electronic device including a programmable processor, a display screen, and a camera, identifying information associated with at least one product physically positioned at a location on a shelf on the sales floor where the camera of the electronic device is aimed;
   analyzing, via the processor of the electronic device, revenue generated by the at least one product physically positioned at the location on the shelf on the sales floor where the camera of the electronic device is aimed and, based on the analyzing, generating a graphical object on the display screen to visibly identify the at least one product that is physically positioned on the shelf at the location where the camera of the electronic device is aimed and that is recommended by the processor of the electronic device to be replaced by a replacement product based on a forecast by the processor of the electronic device that the replacement product will generate more revenue for the retail facility if placed on the shelf instead of the at least one product that is physically positioned on the shelf;

generating, on the display screen, a diminished reality virtual image of the location on the shelf where the product is physically positioned, with the at least one product being virtually removed from the location on the shelf where the at least one product is physically positioned;

generating a virtual list of recommended replacement products based on a forecast by the processor of the electronic device that each of the recommended replacement products will generate more revenue for the retail facility if placed on the shelf instead of the at least one product that is physically positioned on the shelf, and displaying, on the display screen, the virtual list including the recommended replacement products that are selectable to virtually replace the at least one product at the location on the shelf from which the at least one product was virtually removed in the generating step;

selecting, from the virtual list on the display screen, one of the recommended replacement products from the virtual list to virtually replace the at least one product at the location on the shelf from which the at least one product was virtually removed in the generating step;

displaying, on the display screen, a virtual image of the location on the shelf from which the at least one product physically positioned on the shelf was virtually removed, with the selected one of the recommended replacement products being virtually displayed at the location on the shelf from which the at least one product physically positioned on the shelf was virtually removed; and generating, by the processor of the electronic device, the planogram for the retail store based on the selected one of the recommended replacement products being virtually displayed at the location on the shelf from which the at least one product physically positioned on the shelf was virtually removed.

9. The method of claim 8, wherein the electronic device is one of: a head-mountable virtual reality device, a smart tablet, and a smart phone.

10. The method of claim 8, wherein the identifying step further comprises transmitting a query including the identifying information associated with the at least one product captured by the camera from the electronic device to the electronic database.

11. The method of claim 8, wherein the generating the diminished reality virtual image further comprises generating, on the display screen, an empty space instead of the at least one product in the location on the shelf where the at least one product is physically positioned.

12. The method of claim 11, wherein the generating the diminished reality virtual image further comprises:

obtaining a camera feed including a plurality of frames generated by the camera of the electronic device during the capturing step;

segmenting a frame containing the at least one product being virtually removed from the location on the shelf where the at least one product is physically positioned; and deleting the at least one product from the segmented frame to virtually remove the at least one product from the location on the shelf where the at least one product is physically positioned.

13. The method of claim 8, further comprising storing on the electronic database, electronic data configured to facilitate generation of the virtual list by the processor of the electronic device, the electronic data including at least one of: information associated with upcoming product promotions at the retail facility, locations of the products on the shelves on the sales floor of the retail facility, space available on the shelves on the sales floor of the retail facility, demand score for each of the products stored on shelves on the sales floor of the retail facility, and associated products that are often bought with the products stored on shelves on the sales floor of the retail facility; and wherein the displaying, on the display screen, the virtual list including the recommended replacement products further comprises generating the virtual list including the recommended replacement products based on analyzing, by the processor of the electronic device, the electronic data stored on the electronic database.

14. The method of claim 8, wherein the generating the planogram further comprising transmitting the planogram to the electronic database for storage and subsequent retrieval by another electronic device.

* * * * *